C. Durrant,
Horse Collar,
No. 38,889. Patented June 16, 1863.
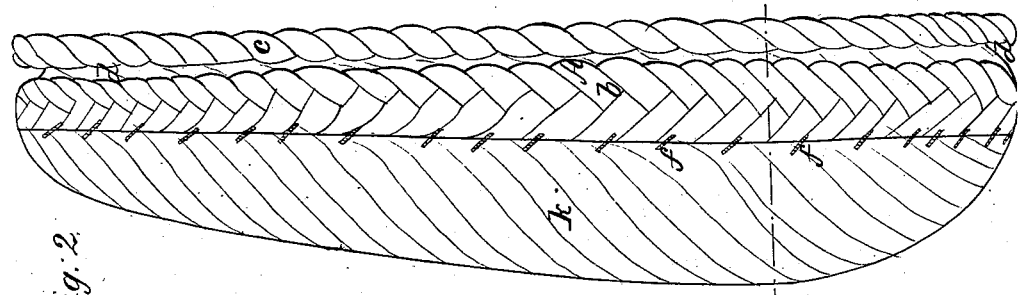
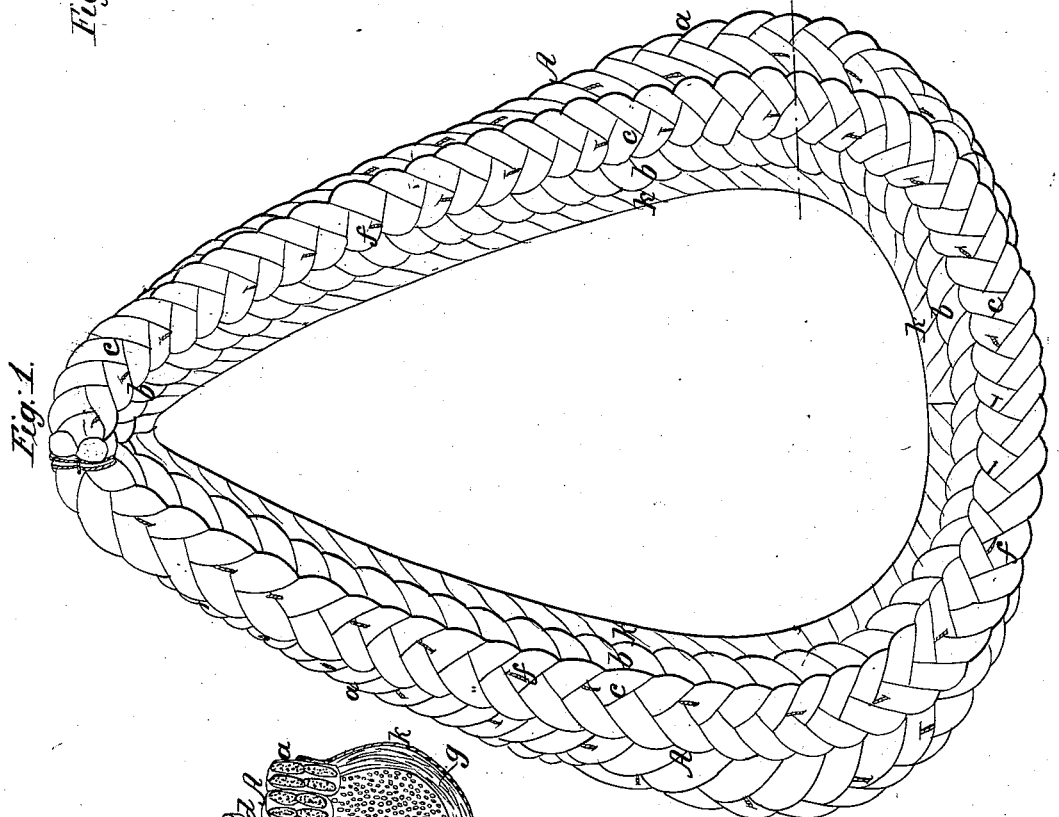
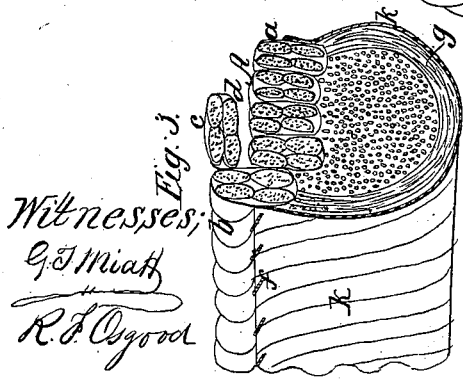
Witnesses:
G. T. Miatt
R. F. Osgood
Inventor;
Crebitt Durrant
by J. Fraser his Atty

UNITED STATES PATENT OFFICE.

CUBITT DURRANT, LYNDONVILLE, NEW YORK.

IMPROVED HORSE-COLLAR.

Specification forming part of Letters Patent No. 38,889, dated June 16, 1863.

*To all whom it may concern:*

Be it known that I, CUBITT DURRANT, of Lyndonville, in the county of Orleans and State of New York, have invented a new and useful Improvement in Horse-Collars; and I do hereby declare that the following is a full and exact description thereof, reference being had to the accompanying drawings, making a part of this specification—

Figure 1 being a front view of my improved horse-collar; Fig. 2, an edge view thereof; Fig. 3, a cross-section of a fragment of the same in the plane indicated by the red line, Figs. 1 and 2.

Like letters designate corresponding parts in all the figures.

The object of my improvement is to produce a horse-collar which is perfectly flexible, elastic, strong, and will absorb the perspiration readily, thereby preventing galling; and the invention consists in forming the skeleton or foundation of braided flags, rushes, or similar vegetable fiber, suitably arranged in the proper shape, the inner side, or that next the animal, being stuffed with the same material and then covered with cloth, substantially as hereinafter described. I prefer ordinary flags or rushes for the purpose above named, such as grow luxuriantly in swampy or wet ground. These are gathered, selected, and properly cured for the purpose, and, preparatory to braiding, they are wet, so as to be pliable and work easily. The braid A thus produced is wound or fashioned into the form of the ordinary horse-collar, one plait being laid over or against another laterally to form the required thickness and strength, as represented at $a$. In order to give the swell or enlargement in the lower portion of the collar, one or more extra short pieces of the braid (according to the fullness of swell) are inserted at that point, but not forming a continuation of the main braid. On the inner front side of the collar the braid projects outward, as represented at $b$, sufficiently far to allow a lateral braid, $c$, to be secured thereto, behind which is the recess $d$ for the reception of the hames. The latter braid extends entirely around at the top as well as the bottom, and forms a perfect cover and security for the hames. The skeleton thus arranged is securely sewed together by threads $ff$ in any convenient manner. The braid on one side is provided with projecting ends of the flags or rushes of sufficient length for the purpose designed, and these ends are combed or slit so as to furnish a complete fringe or covering the whole circuit of the collar, as represented at $g$, Fig. 3. Rushes or similar stalks are then laid in lengthwise on the braid foundation of suitable thickness, as represented at $h$, and the fringe or covering $g$ then drawn over, encircling them, and suitably secured at the opposite side of the collar. This furnishes the stuffing. The stuffing is covered outside with a lining of strong cloth, $k$, of suitable extent to cover all that portion of the collar that comes in contact with the animal's shoulder. The cloth is secured to the braids by sewing in any usual manner.

A horse-collar constructed in this manner possesses many important and obvious advantages. It is perfectly flexible and elastic and adapts itself to the shoulder without unequal bearing on any part, rubbing, or irregularity of action. Its porousness allows a free passage of air through the whole to come in contact with the shoulder of the animal, thus keeping it cool and assisting the evaporation of the perspiration. In the use of the ordinary leather collar the leather becomes so hardened and impervious by the absorption of perspiration that no air can reach the parts on which the collar bears, and the shoulder thus becomes galled. This is especially the case where the draft is steady, constant, and unvarying, and where there is no reaction of any kind, as on canals. The stuffing formed as described furnishes a soft and elastic cushion which yields to any unusual shock, and it is also very enduring, being strongly secured before the cloth is sewed on. The strength thus principally depends on the braided material while it is perfectly protected from wear by the cloth lining. The strength is rendered much greater by the employment of the transverse fringe or covering $g$ of the braids inclosing the loose stuffing than if the latter were placed in contact with the cloth, and when the latter is worn off it may be replaced without the stuffing being in anywise affected or having suffered any loss. The cloth furnishes a smooth surface resting against the horse's shoulder and conducts the perspiration to the inner porous material, which absorbs it and prevents galling. The extra short pieces of braid in the swell of the collar give the perfect form required at that part to furnish a proper bearing where the greatest strain comes.

What I claim as my invention, and desire to secure by Letters Letters, as a new article of manufacture, is—

The improved horse-collar herein described, the skeleton or foundation being composed of braids of flags or rushes, and the stuffing composed of rushes or other stalks, retained in place by the transverse fringe or covering $g$, to give additional strength, and covered by the cloth lining $k$, the whole constructed and arranged substantially as herein set forth.

In witness whereof I have hereunto signed my name in the presence of two subscribing witnesses.

CUBITT DURRANT.

Witnesses:
　THOMAS FERGUSON,
　D. W. COLE.